United States Patent
Gilson et al.

(10) Patent No.: US 8,060,642 B2
(45) Date of Patent: Nov. 15, 2011

(54) TECHNIQUES FOR HOST TO HOST TRANSFER OF SEQUENTIAL MEDIA AND USE OF PERSISTENT RESERVATION TO PROTECT MEDIA DURING HOST TO HOST TRANSFER

(75) Inventors: Raymond Wesley Gilson, Saint Paul, MN (US); Adonijah Park, Forest Lake, MN (US)

(73) Assignee: Symantec Corporation, Mountain View, CA (US)

( * ) Notice: Subject to any disclaimer, the term of this patent is extended or adjusted under 35 U.S.C. 154(b) by 1087 days.

(21) Appl. No.: 11/694,838

(22) Filed: Mar. 30, 2007

(65) Prior Publication Data
US 2008/0244032 A1    Oct. 2, 2008

(51) Int. Cl.
G06F 15/16    (2006.01)
G06F 12/00    (2006.01)
G06F 11/00    (2006.01)

(52) U.S. Cl. ............... 709/232; 710/38; 710/200; 714/2

(58) Field of Classification Search .................. None
See application file for complete search history.

(56) References Cited

U.S. PATENT DOCUMENTS

| 5,455,926 | A  | * | 10/1995 | Keele et al. ................ 711/4 |
| 6,658,587 | B1 | * | 12/2003 | Pramanick et al. .......... 714/5 |
| 7,272,674 | B1 | * | 9/2007  | Nandi et al. ................ 710/38 |
| 7,613,947 | B1 | * | 11/2009 | Coatney et al. ............. 714/6 |
| 2005/0044281 | A1 | * | 2/2005 | McCarthy .................. 710/5 |
| 2005/0055468 | A1 | * | 3/2005 | Reuter et al. ............... 710/1 |
| 2005/0278465 | A1 | * | 12/2005 | Qi ......................... 710/36 |
| 2007/0214317 | A1 | * | 9/2007 | Kalos et al. ................ 711/114 |

* cited by examiner

Primary Examiner — Wen-Tai Lin
(74) Attorney, Agent, or Firm — Wilmer Cutler Pickering Hale and Dorr LLP

(57) ABSTRACT

Techniques for host to host transfer of media and the use of persistent reservation to protect media during host to host transfer is disclosed. Exemplary embodiments may be realized as methods and systems for transferring a sequential media loaded in a drive from a first host to a second host without physically unloading the media. The first host may have a persistent reservation or non-persistent reservation of the drive. Likewise, the second host may have a persistent reservation or non-persistent reservation of the drive. Logical unload, logical load and preemption commands are utilized as is error recovery from a failed reservation.

24 Claims, 5 Drawing Sheets

TECHNIQUES FOR HOST TO HOST TRANSFER OF SEQUENTIAL MEDIA AND USE OF PERSISTENT RESERVATION TO PROTECT MEDIA DURING HOST TO HOST TRANSFER

FIELD OF THE DISCLOSURE

The present invention relates generally to data storage in a networked environment and, more particularly, to techniques for host to host transfer of media and use of persistent reservation to protect media during host to host transfer.

BACKGROUND OF THE DISCLOSURE

A network data storage device is a device or system used for centrally storing or retrieving large amounts of data for multiple network nodes. While there are various types of conventional network data storage devices, one exemplary type is a sequential media network data storage device. A sequential media network data storage device is implemented with one or more drives that are operable with at least one removable media element, such as an optical or magnetic media. Optical media is typically formed as a disk whereas magnetic media is typically formed as a tape on a spool or in a cartridge.

In the enterprise arena, sequential media network storage devices implemented with libraries of magnetic media are widely used. Their degree of market penetration is attributable to their large capacities and low cost per unit of storage. However, sequential media network data storage devices do have drawbacks, namely access time delays, susceptibility to data loss and underutilization.

There are several time delays that may occur when accessing a magnetic media. Typically, a drive is able to load only one magnetic tape at a time. Accordingly, there is time delay associated with retrieving the magnetic tape from the library and loading the magnetic tape in the drive. Further, if another magnetic tape is loaded in the drive, that magnetic tape must be rewound and unloaded. Thus, there is an additional time delay experienced that is equal to the amount of time it takes to rewind and unload magnetic tape from the drive. Still further, once magnetic tape is loaded in a drive, it may have to be located to the appropriate position, thereby adding to the time delay. In it not uncommon for the aggregate of the above time delays to be in excess of five minutes. Accordingly, sequential media network storage devices implemented with libraries of magnetic media experience significant time delays when accessing magnetic media. Conventional implementations fail to address the problem of time delay and, as describe below, actually perpetuate it.

Magnetic tape is highly susceptible to data loss due to positional changes and the overwriting of data. In a typical network scenario, there are multiple entities that could access and write data to a drive. Accordingly, without a mechanism in place to control drive access, data may be overwritten. The solution in the conventional art, as described in detail below, is to have a centralized entity manage access to a drive by coordinating an exclusive reservation of the drive. While a network entity posses an exclusive reservation to a drive, other network entities are prevented from accessing the drive. Thereby, data loss is mitigated. However the conventional solution is only partly effective in that the drive is venerable to data loss at times between reservations. Further, the conventional art perpetuates access time delay in that the conventional reservation mechanism requires the loading and unloading of the magnetic tape in order to transfer hosts. Still further, the conventional solution leads to an underutilization of the magnetic media in a media library.

FIG. 2 is a flowchart of an exemplary conventional method for a host to host transfer of media. In step 201, a controlling server manages client storage tasks. The management includes making the selection of the host/drive/media combination for the next storage task based on information obtained from a master server. Herein, the controlling server selects a drive/media combination that is coupled with a non-selected host. In other words, the controlling server has selected a media to use with the selected host that is exclusively reserved by a non-selected host.

To initiate the transfer, the controlling server, in step 203, issues a release command instructing the non-selected host to physically rewind and unload the media, and release the exclusive reservation. In step 205, the non-selected host responds by controlling the selected drive to physically rewind and unload the media. After which, in step 207, the non-selected host releases the exclusive reservation of the selected drive. The host then reports the release of the exclusive reservation to the controlling host in step 209. At this time, both the drive and media are vulnerable to acquisition by another host acting outside the control of the controlling server. In step 211, the controlling server issues a reserve command instructing the selected host to establish a reservation with the selected drive and to load the selected media.

In step 213, it is determined if the selected host successfully establishes the reservation. Such determination is typically made by the selected host and reported to the controlling server. However, the controlling server may make this determination itself or via another intermediary. If the exclusive reservation was not successful, the method returns to step 201. If the exclusive reservation is established, the selected host loads the selected media in the selected drive in step 215. The selected host then performs the client storage task using the selected media in the selected drive. The selected host reports the completion of the storage task to the controlling server in step 219. After which, control returns to step 201.

Accordingly, the above described conventional method for host to host transfer of media requires that even if the media is to be used in the same drive it is loaded in, it has to be physically unloaded and reloaded which results in time delay and additional wear and tear on the loading/unloading mechanism. Further, the releasing and subsequent establishment of the reservations by the hosts leaves the drive and media vulnerable to acquisition or data loss. In addition, when a reservation error occurs there is no mechanism in place by which to recover the drive.

In view of the foregoing, it would be desirable to provide techniques for host to host transfer of sequential media and the protection of sequential media during host to host transfer which overcomes the above-described inadequacies and shortcomings.

SUMMARY OF THE DISCLOSURE

Techniques for host to host transfer of sequential media and use of persistent reservation to protect media during host to host transfer are disclosed. In one particular exemplary embodiment, one technique may be realized as a method operable in a controlling server for transferring a media loaded in a drive from a first host to a second host, wherein the first host comprises a non-persistent reservation of the drive. The method includes sending a logical unload command instructing the first host to logically unload the media and release the non-persistent reservation. Further, the method includes determining if the second host will establish a non-persistent reservation or persistent reservation of the drive. In addition the method includes sending a logical load command instructing the second host to logically load the media.

In accordance with further aspects of this particular exemplary embodiment, if it is determined that the second host will establish a non-persistent reservation, the logical load command further comprises an instruction to establish the non-persistent reservation of the drive.

In accordance with still further aspects of this particular exemplary embodiment, if it is determined that the second host will establish a persistent reservation with the drive, the method further comprises generating a key for use by the second host in establishing the persistent reservation.

In accordance with additional aspects of this particular exemplary embodiment, the logical load command further comprises an instruction for the second host to establish the persistent reservation of the drive using the generated key.

In accordance with further aspects of this particular exemplary embodiment, the key comprises an identifier of the drive and an identifier of the host.

In accordance with additional aspects of this particular exemplary embodiment, the keys further comprises an allocation index associated with the drive/media coupling.

In accordance with still further aspects of this particular exemplary embodiment, wherein the media is transferred from the first host to a second host without physically unloading or loading the media.

In accordance with further aspects of this particular exemplary embodiment, the persistent reservation comprises a SCSI persistent reservation.

In accordance with additional aspects of this particular exemplary embodiment, the media comprises sequential media.

In accordance with further aspects of this particular exemplary embodiment, the sequential media comprises magnetic media.

In another particular exemplary embodiment, one technique may be realized as a method in a controlling server for transferring a sequential media loaded in a drive from a first host to a second host without physically unloading the media, wherein the first host has a persistent reservation of the drive. The method includes sending a logical unload command instructing the first host to logically unload the media and retain the persistent reservation. The method further includes determining if the second host will establish a non-persistent reservation or persistent reservation of the drive. Still further, the method includes sending a logical load command instructing the second host to logically load the media.

In accordance with further aspects of this particular exemplary embodiment, if it is determined that the second host will establish a non-persistent reservation, instructing the first host to release the persistent reservation.

In accordance with still further aspects of this particular exemplary embodiment, the logical load command further comprises an instruction to the second host to establish the reservation of the drive.

In accordance with further aspects of this particular exemplary embodiment, if it is determined that the second host will establish a persistent reservation, the method further comprises generating a key for use by the second host in establishing the persistent reservation.

In accordance with yet additional aspects of this particular exemplary embodiment, sending a preemption command to second host instructing the second host to preempt the persistent reservation of the first host, the preemption command comprising a key of the first host and the generated key of the second host.

In accordance with yet further aspects of this particular exemplary embodiment, each of the key of the first host and the generated key of the second host comprises an identifier of the drive and an identifier of the host.

In accordance with additional aspects of this particular exemplary embodiment, each of the key of the first host and the generated key of the second host further comprises an allocation index associated with the drive/media coupling.

In accordance with yet additional aspects of this particular exemplary embodiment, the media is transferred from the first host to a second host without physically unloading or loading the media.

In accordance with still further aspects of this particular exemplary embodiment, the persistent reservation comprises a SCSI persistent reservation.

In accordance with additional aspects of this particular exemplary embodiment, the media comprises sequential media.

In accordance with yet further aspects of this particular exemplary embodiment, the sequential media comprises magnetic media.

In one particular exemplary embodiment, one technique may be realized as a method operable in a controlling server for error recovery from a failed persistent reservation. The method includes receiving an error message from the host comprising a key held by the drive for a persistent reservation. The method additionally includes determining if the key was generated by the controlling host. The method also includes controlling the recovery of the drive if the key was generated by the controlling host.

In accordance with additional aspects of this particular exemplary embodiment, controlling the recovery of the drive comprises generating another key, and sending a command to the host or another host instructing the host or another host to preempt the reservation of the drive using the generated another key and to physically unload a media from the drive.

In accordance with further aspects of this particular exemplary embodiment, the key comprises at least two of a drive identifier, host identifier or media allocation index identifier.

In accordance with yet further aspects of this particular exemplary embodiment, determining if the key was generated by the controlling host comprises determining if at least one portion of the key matches at least one of drive identifier, host identifier, or media allocation index identifier stored by the controlling host.

In accordance with additional aspects of this particular exemplary embodiment, sending a preempt command instructing a host to preempt a persistent reservation of a drive.

In one particular exemplary embodiment, one technique may be realized as a system for transferring a media loaded in a drive from a first host to a second host, wherein the first host comprises a non-persistent reservation of the drive. The system comprises a means for sending a logical unload command instructing the first host to logically unload the media and release the non-persistent reservation. The system further comprises a means for determining if the second host will establish a non-persistent reservation or persistent reservation of the drive. In addition, the system comprises a means for sending a logical load command instructing the second host to logically load the media.

In one particular exemplary embodiment, one technique may be realized as a system for transferring a media loaded in a drive from a first host to a second host, wherein the first host comprises a persistent reservation of the drive. the system comprises means for sending a logical unload command instructing the first host to logically unload the media and retain the persistent reservation. The system further includes a means for determining if the second host will establish a non-persistent reservation or persistent reservation of the drive. Also the system includes a means for sending a logical load command instructing the second host to logically load the media.

In one particular exemplary embodiment, one technique may be realized as a system for error recovery from a failed persistent reservation. The system comprising a means for sending a preempt command instructing a host to preempt a persistent reservation of a drive. The system further includes a means for receiving an error message from the host comprising a key held by the drive for a persistent reservation. Still further, the system includes means for determining if the key was generated by the controlling host. Also the system includes means for controlling the recovery of the drive if the key was generated by the controlling host.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
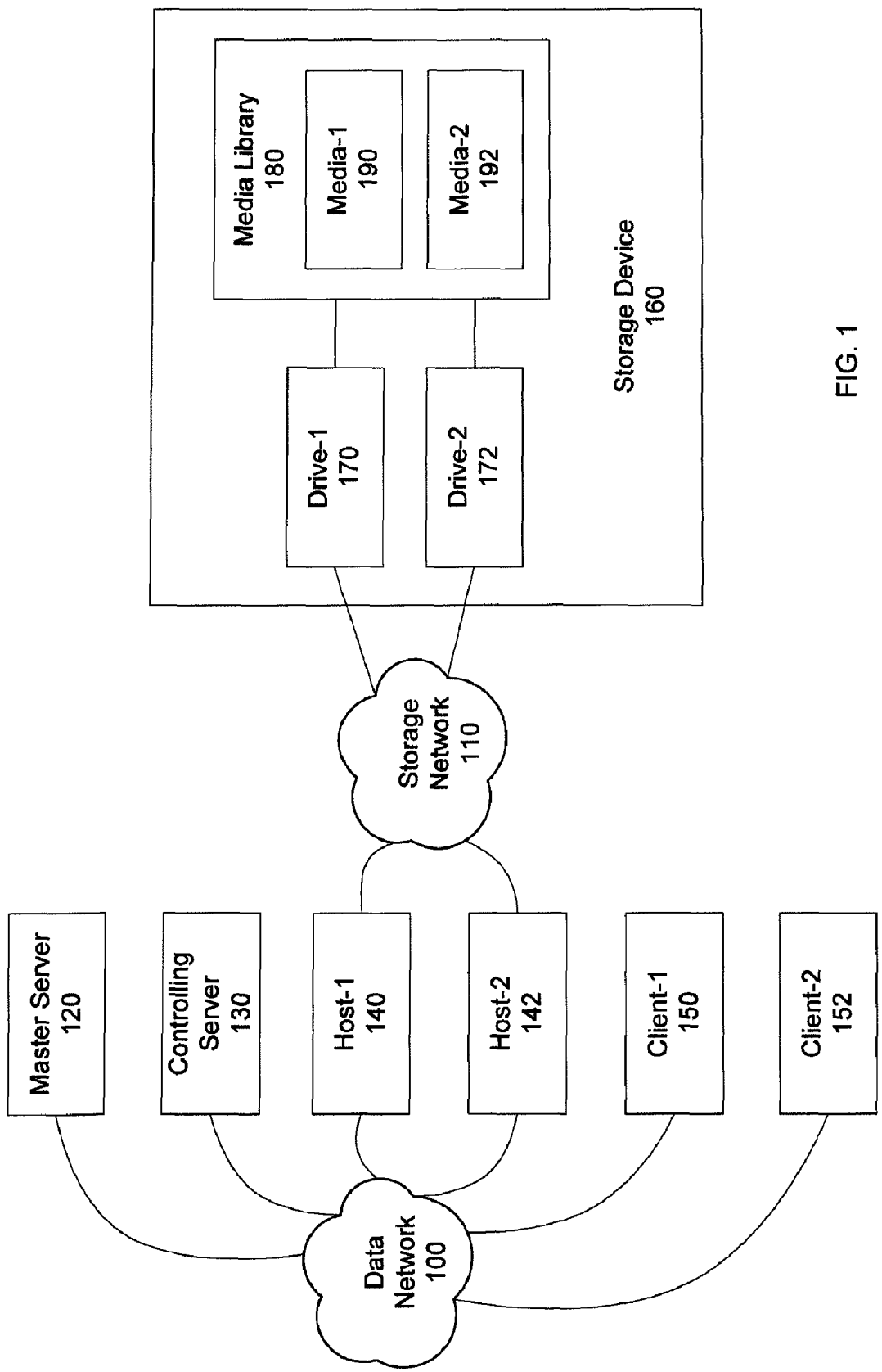
FIG. 1 shows a schematic block diagram of an exemplary network environment implementing a sequential media network storage device.
Figure 2:
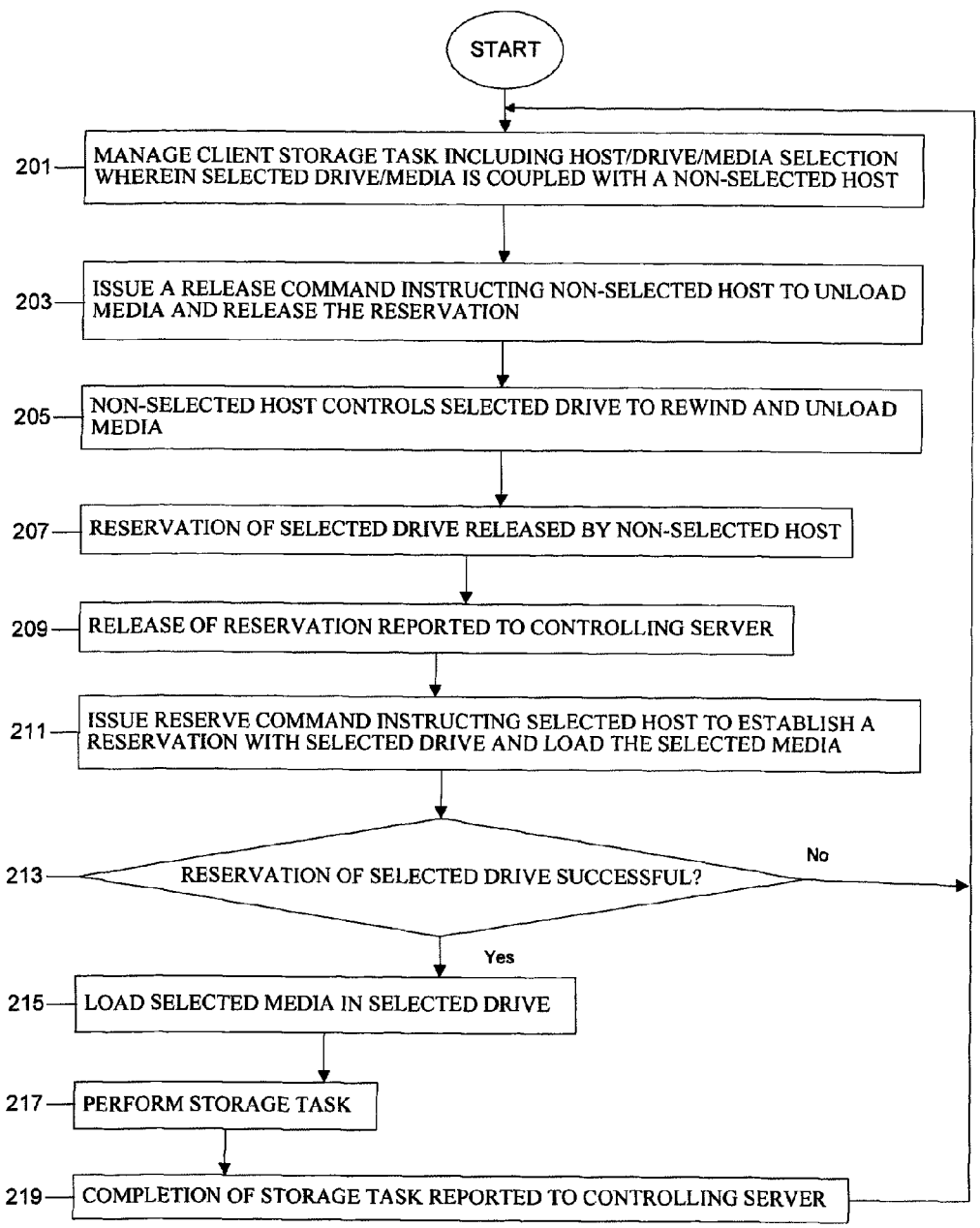
FIG. 2 shows a flowchart of an exemplary conventional method for host to host transfer of sequential media.

FIG. 1 is a schematic block diagram of an exemplary network environment implementing a sequential media network data storage device. Data Network 100 facilitates communications between various networks nodes such as servers, hosts, clients, network caches, switches or the like. Network 100 may comprise a Local Area Network (LAN), Wide Area Network (WAN), Virtual Private Network (VPN), or any combination thereof. Additionally, any other type of network that enables communication between the network nodes and/ or other nodes or gateways may be used or included.

As illustrated in FIG. 1, Data Network 100 interconnects Master Server 120, Controlling Server 130, Host-1 140, Host-2 142, Client-1 150 and Client-2 152. Further, Drive-1 (D-1) 170 and Drive-2 (D-2) are interconnected to Host-1 140 and Host-2 142 via Storage Network 110. Storage Network 110 may comprise a Storage Area Network (SAN), iSCSI, Parallel SCSI, Fiber Channel or any other appropriate storage network. Additionally, Data Network 100 may comprise Storage Network 110. Storage Device 160 is comprised of Drive-1 170, Drive-2 172 and Media Library 180. Media Library 180 comprises Media-1 190 and Media-2 192. Media-1 190 and Media-2 192 are preferably magnetic media in the form of magnetic tape but may be any other type of sequential media, such as optical media. While Drive-1 170 and Drive-2 172 are illustrated as being associated with Media Library 180, each of Drive-1 170 and Drive-2 172 may be associated with other media libraries or may be individually associated with a media library. Further, while Media Library 180 is depicted as part of Storage Device 160, Media Library 180 may exist separate from Storage Device 160 and be additionally accessible by other storage devices.

For ease of explanation, only one or two hosts, clients, storage devices, storage drives, media libraries and media are depicted in FIG. 1. However, as is understood in the art, any number of hosts, clients, storage devices, storage drives, media libraries and media may be implemented. Further, while Master Server 120, Controlling Server 130, the hosts and the clients have been separately illustrated, any combination thereof may be implemented. For example, Master Server 120 may be combined with Controlling Server 130. By further example, Host-1 140 may be combined with Client-1 150.

Master Serve 120 stores and processes policy information that is used to determine when storage tasks for clients are to be performed. Further, the policy information is used to determine which host, path, drive and media to utilize for a particular storage task. In addition, Master Serve 120 stores various other types of information including configuration information for the entities involved in storage tasks.

Controlling Server 130 implements the policy stored in Master Serve 120 so as to control the data storage system. Host-1 140 and Host-2 142 receive and act on commands from Controlling Server 130 and communicate information to Controlling Server 130. Further, Host-1 140 and Host-2 communicate with Client-1 150 and Client-2 152 to facilitate client storage tasks, such as uploading or downloading data to the media via the drives. In addition, based on the commands received from Controlling Server 130, Host-1 140 and Host-2 142 communicate with and control Drive-1 170, Drive-2 172 and Media Library 180. Drive-1 170 and Drive-2 172 are used to read and write data to media.

As indicated above, network storage devices based on sequential media require the use of exclusive reservations for access to a drive. The use of conventional exclusive reservations in the arts of sequential media has thus far required the loading and unloading of the sequential media in drive. However, there is another type of exclusive reservation, namely the exclusive SCSI persistent reservation. The below exemplary embodiments utilize either one or both of the conventional exclusive reservation and the exclusive SCSI persistent reservation. However, instead of the exclusive SCSI persistent reservation, any other type of exclusive persistent reservation may be used. Further while below exemplary embodiments describe host to host transfer of media, Host to Host transfer of media is not limited to two separate physical hosts. Host to host transfer of media may occur with a single host by using plural paths coupled to the host. Even further, the host to host transfer of media may occur with a single physical host via an external data storage device controlled by the host, such as an NDMP filer.

Figure 3:
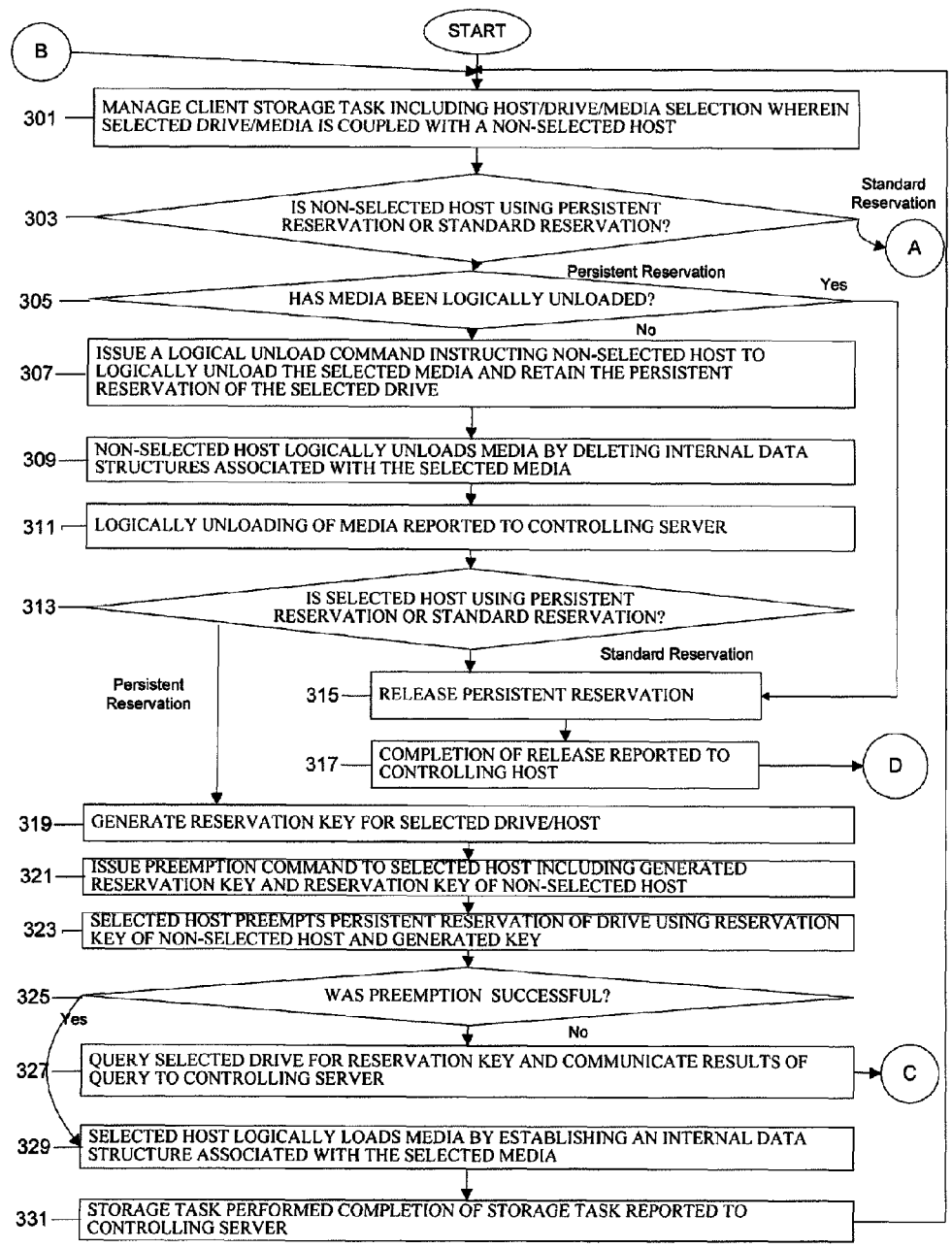
FIGS. 3 and 4 show a flowchart of a method for host to host transfer of sequential media according to an exemplary embodiment.
Figure 4:
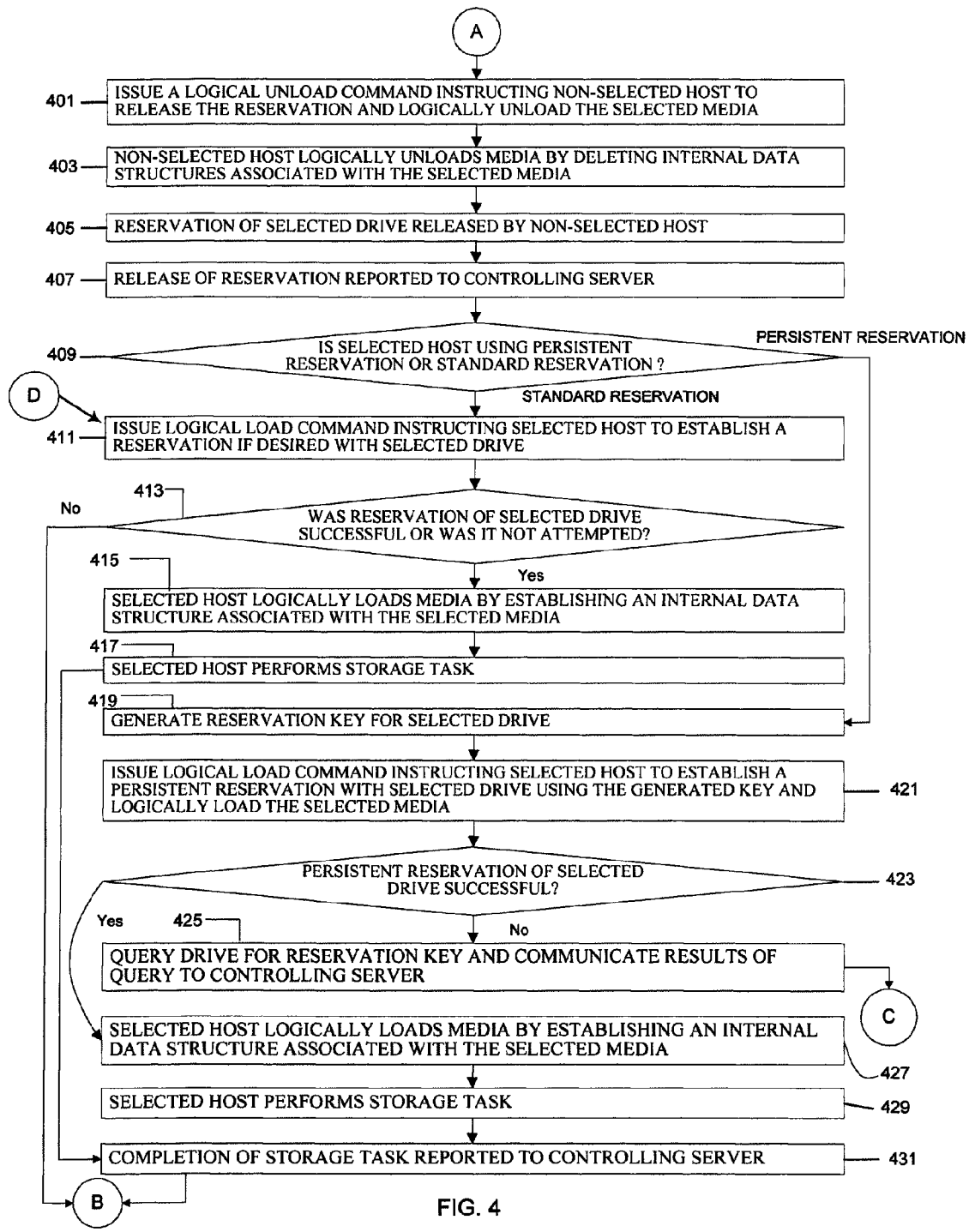

FIGS. 3 and 4 show a flowchart of a method for host to host transfer of sequential media according to an exemplary embodiment. In step 301 of FIG. 3, Controlling Server 130 manages client storage tasks. The management includes the selection of the host/drive/media combination for the next storage task based on information obtained from Master Server 120. Herein, Controlling Server 130 selects a drive/media combination that is coupled with a non-selected host. In other words, Controlling Server 130 has selected a media to use with the selected host that is exclusively reserved by a non-selected host.

Prior to initiating the transfer, Controlling Server 130 in step 303 determines if the exclusive reservation held by the non-selected host is a persistent reservation or standard reservation. The scenario wherein the exclusive reservation is held by the non-selected host is a standard reservation, is discussed in detail below with respect to FIG. 4. However, if the exclusive reservation held by the non-selected host is a persistent reservation, the Controlling Server 130 determines if the drive has logically unloaded the media in step 305. Hosts retain information on the media they are loaded with such as media identifiers, allocation indexes, or the like. The information is referred to as an internal data structure. A logical unload of media is accomplished by the host deleting the internal data structures associated with the media. By deleting the internal data structures, there is no indication to the host that the media is loaded. In other words, by deleting the internal data structures a fake unload of the media is achieved.

A logical unload of the media requires that that there be a persistent reservation of the drive. Here, an indication that the drive has already been logically unloaded, would suggest that there is a persistent reservation error scenario. Accordingly, step 305 is operative to rectify a persistent reservation error. If the media has been logically unloaded, the method jumps to step 315 which is described below. If the media was not logically unloaded then the method proceeds to step 307. In step 307, controlling Server 130 issues a logical unload command instructing the non-selected host to logically unload the selected media and retain the persistent reservation of the selected drive. Next, in step 309, the non-selected host logically unloads the media by deleting the internal data structures associated with the selected media. The non-selected host, in step 311, then reports the logical unloading of the media to Controlling Server 130. Controlling Server 130 in step 313 determines if the selected host is using persistent reservation or standard reservation. If the selected host is using standard reservation, the non-selected host releases the persistent reservation in step 315 and then the completion of the release is reported to the controlling host in step 317. After step 317, the method progresses to step 411 of FIG. 4 which is described in greater detail below. Returning to step 313, if the selected host is using persistent reservation, Controlling Server 130 generates a reservation key for the selected drive/host in step 319.

A reservation key is unique identifier of a host/drive/media coupling. It is comprised of an identifier of the host, an identifier of the drive and an allocation index of the drive/media coupling. The unique key is described in further detail below with respect to FIG. 5. In step 321, Controlling Server 130 issues a preemption command to the selected host including the generated reservation key and reservation key of non-selected host. Preemption is a seamless transfer of reservation without a gap in time or ownership. Since there is no gap with the transfer of reservations with preemption, the possibility of undesired access to the drive/media pair between reservations is prevented.

After receiving the preemption command, the selected host preempts the persistent reservation on the drive using a reservation key of the non-selected host and the generated key in step 323. It is then determined in step 325 if preemption was unsuccessful. If the preemption was not successful, then the selected host queries the selected storage device for a reservation key and communicates the results of query to controlling server in step 327. After step 327, the method progresses to step 501 of FIG. 5, described in greater detail below. Returning to step 325, if the preemption was successful, the selected host logically loads the media by establishing an internal data structure associated with the selected media in step 329. After which, in step 331, storage task is performed and then completion of storage task is reported to the controlling server.

Returning to step 303, if the non-selected host is using standard reservation, the method progresses to step 401 of FIG. 4. In step 401, Controlling Server 130 issue a logical unload command instructing the non-selected host to release the reservation and logically unload the selected media. The non-selected host then, in step 403, logically unloads the media by deleting the internal data structures associated with the selected media. In step 405, the reservation of the selected drive is released by the non-selected host. The release of the reservation is then reported to the Controlling Server 130 in step 407. In step 409, Controlling Server 130 determines if the selected host is using a persistent reservation or a standard reservation. If the selected host is using a standard reservation, the Controlling Server 130 in step 411 issues a logical load command instructing the selected host to establish a reservation with the selected drive. However, the host may alternatively operate without a reservation if desired. Step 411 is also the next step after step 317 in FIG. 3.

After step 411, it is determined in step 413 if the reservation of the selected drive was successful or if it was not attempted. If it was attempted and unsuccessful, then the method returns to the beginning, namely step 301 of FIG. 3. If it was successful or not attempted, then the selected host in step 415 logically loads the media by establishing an internal data structure associated with the selected media. Next, the selected host performs the storage task in step 417, and in step 431, completion of storage task is reported to the controlling server. The method then returns to the beginning, namely step 301 of FIG. 3. Returning to step 409, if the selected host is using persistent reservation, the Controlling Host 130 generates a reservation key for the selected drive in step 419. The Controlling Host 130, in step 421, then issues a logical load command instructing the selected host to establish a persistent reservation with the selected drive using the generated key and then logically loads the selected media. It is then determined in step 423 if the persistent reservation of the selected drive was successful. If it was not successful, the host queries the storage device for a reservation key and communicates the results of the query to the controlling server in step 425.

Figure 5:
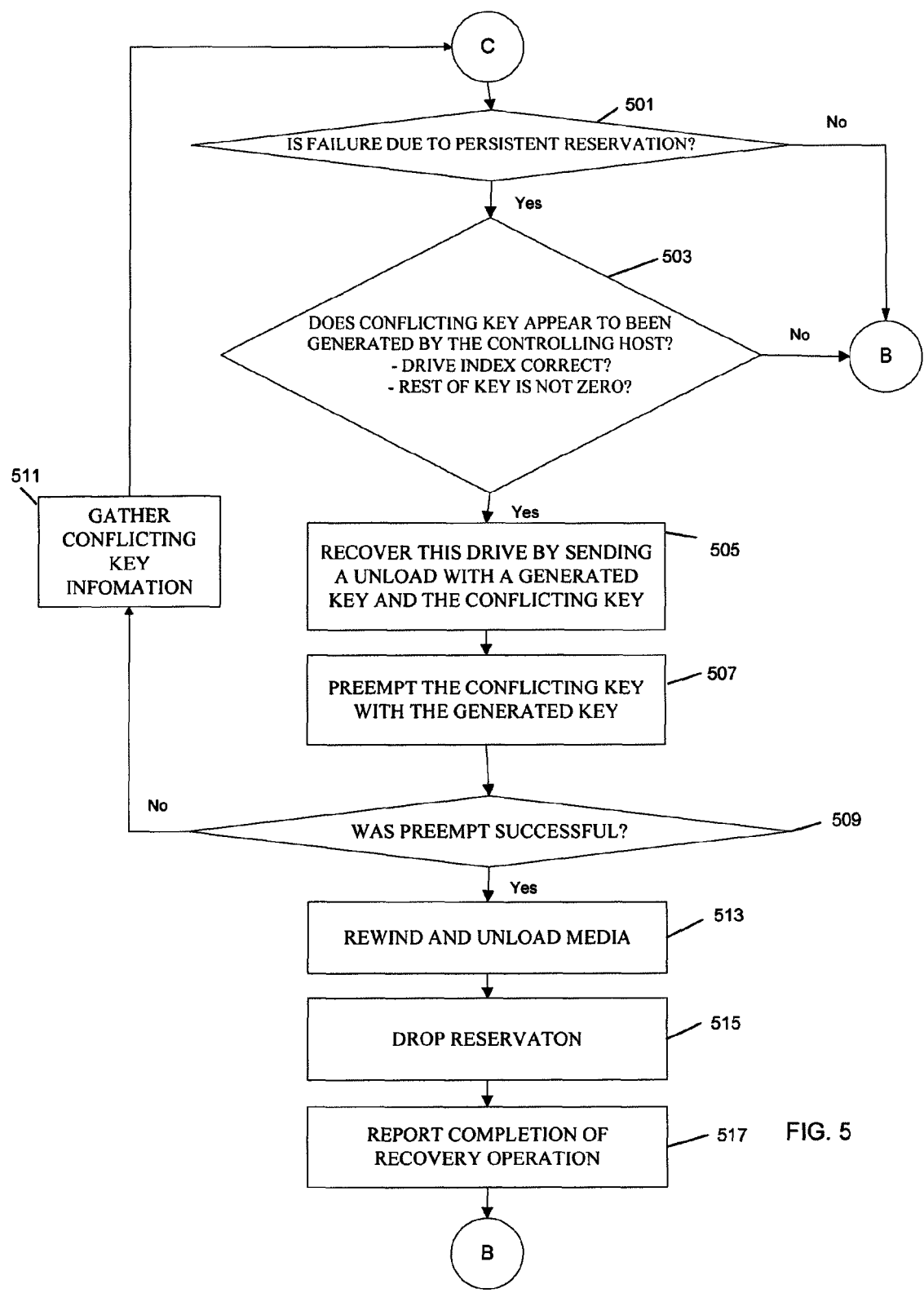
FIG. 5 shows a flowchart of a method for persistent reservation error recovery according to an exemplary embodiment.

The method then continues at element 501 of FIG. 5. However, if in step 423, the persistent reservation was successful, the selected host, in step 427, logically loads media by establishing an internal data structure associated with the selected media. In step 429 the selected host performs a storage task and in step 431 the completion of storage task is reported to the controlling server. The method then returns to the beginning, namely step 301 of FIG. 3.

The host to host transfer of media according to the above exemplary embodiments significantly reduces time delays associated with the loading, retrieval and unloading of media. Further, certain implementations ensure that the a competing entity cannot use or reserve the drive or media during the transfer, thereby saving time and preventing the possibility of data loss. Moreover, by sharing media the usage efficiency of the media is significantly increased. Still further, the exemplary embodiments are adaptable for use in a network where some devices may use persistent reservation while other devices only use standard reservation.

FIG. 5 shows a flowchart of a method for persistent reservation error recovery according to an exemplary embodiment. The error recovery method begins after steps 327 of FIG. 3 and 425 of FIG. 4. Error recovery is triggered when an attempt by a host to establish a persistent reservation of a drive fails. Failures may be caused by any number of events, such as hardware failure, power loss, misbehaving network entities, or any of a number of other events.

In step 501, it is determined if the failure event is associated with a persistent reservation. This is determined by whether or not a key is retrieved from the drive that failed to establish the persistent reservation with the host. If no key is retrieved, the failure is not associated with a persistent reservation and the method then returns to the beginning, namely step 301 of FIG. 3. However, if the failure event is associated with a persistent reservation, Controlling Host 130 may be able to safely recover the drive. The Controlling Host 130 will be able to safely recover the drive if it was the controlling host that had issued the key.

In step 503, Controlling Server 130 determines if it issued the key by comparing information in the key to information it stores in a database. The information stored in the database includes indices associated with hosts, drives and drive/media couplings. Preferably, identifiers associated with the devices are determined based on an order of entry of the device into the index. This implementation provides sufficient randomization such that it is unlikely that another key issuing entity would have the same identifier for any given device, let alone a combination of devices. Accordingly, the device identifier has a sufficient level of uniqueness. Of course, the device identifiers could be created in any other manner, such as a random number generator, so long as the identifiers have a degree of uniqueness to them. It is preferred that the indices associated with the devices remain fixed values. However, for drive/media couplings, an allocation is further retained. The allocation index is an identifier that changes whenever the drive/media coupling is changed. This enables the Controlling Server 130 to determine the use of the media. Keys issued for persistent reservations comprise identifiers from the database. Preferably, a generated key comprises identifiers for devices involved in a persistent reservation, namely the drive, host and media. Despite the use of the key for error recovery, it may also be utilized for debugging other failures.

Returning to element 503, Controlling Server 130 checks if the drive identifier in the key matches the drive identifier in its database. Also, it checks to see if the rest of the key is not zero. Based on the above tests, the Controlling Server 130 is able to determine with an acceptable degree of certainty whether it generated the key or not.

If the Controlling Server 130 did not generate the key then it will not be able determine with enough certainty the potential harm caused by breaking the reservation. On the other hand, if the Controlling Server 130 did generate the key, it would be aware of any use of the drive and therefore can predict the degree of harm that would occur by recovering the drive. Thus, if the Controlling Server 130 determines that it did not issue the key the method then returns to the beginning, namely step 301 of FIG. 3. However, if Controlling Server 130 issued the key, then in step 505, Controlling Server 130 server sends the host a command instructing the host to preempt the reservation and to physical unload the media. Included with the command is the conflicting key and a newly generated key.

The host attempts the preemption in step 507 and then determines if the preemption was successful in step 509. If the preempt was not successful, the conflicting key information is gathered by the host in step 511 and sent to the Controlling Server 130 at which point the error recovery method returns to the beginning at step 501. If the preemption was successful, the host rewinds and unload the media in step 513. In step 515, the host releases the persistent reservation, and then in step 517, reports the completion of the recovery operation to the Controlling Server 130. The method then returns to the step 301 of FIG. 3.

Error recovery according to the above exemplary embodiment enables a drive, that fails to have a persistent reservation established for it, to be recovered with a degree of predictable, thereby preventing the loss of time or data by interrupting another entities use of the drive.

At this point it should be noted that the system and methods in accordance with the present disclosure as described above typically involves the processing of input data and the generation of output data to some extent. This input data processing and output data generation may be implemented in hardware or software. For example, specific electronic components may be employed in a computer server, network storage device or similar or related circuitry for implementing the functions associated with media sharing and drive error recovery in accordance with the present disclosure as described above. Alternatively, one or more processors operating in accordance with stored instructions may implement the functions associated with the host to host transfer of sequential media and use of persistent reservation to protect media during host to host transfer in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method operable in a controlling server for transferring a media loaded in a drive from a first host to a second host, wherein the first host comprises a non-persistent reservation of the drive, the method comprising:

sending a logical unload command instructing the first host to logically unload the media and release the non-persistent reservation;

determining if the second host will establish a non-persistent reservation or persistent reservation of the drive;

sending a logical load command instructing the second host to logically load the media, wherein the media is transferred from the first host to the second host without physically unloading or loading the media; and generating a key for use by the second host in establishing the persistent reservation in the event it is determined that the second host will establish the persistent reservation of the drive, wherein the key comprises an allocation index associated with a drive/media coupling.

2. The method of claim 1, wherein if it is determined that the second host will establish the non-persistent reservation, the logical load command further comprises an instruction to establish the non-persistent reservation of the drive.

3. The method of claim 1, the logical load command further comprises an instruction for the second host to establish the persistent reservation of the drive using the generated key.

4. The method of claim 3, wherein the key comprises an identifier of the drive and an identifier of the host.

5. The method of claim 1, wherein the persistent reservation comprises a SCSI persistent reservation.

6. The method of claim 1, wherein the media comprises sequential media.

7. The method of claim 6, wherein the sequential media comprises magnetic media.

8. At least one non-transitory processor readable storage medium storing a computer program of instructions configured to be readable by at least one processor for instructing the at least one processor to execute a computer process for performing the method as recited in claim 1.

9. A method operable in a controlling server for transferring a sequential media loaded in a drive from a first host to a second host, wherein the first host comprises a persistent reservation of the drive, the method comprising:
sending a logical unload command instructing the first host to logically unload the media and retain the persistent reservation;
determining if the second host will establish a non-persistent reservation or persistent reservation of the drive; and
sending a logical load command instructing the second host to logically load the media, wherein the media is transferred from the first host to the second host without physically unloading or loading the media; and
generating a key for use by the second host in establishing the persistent reservation in the event it is determined that the second host will establish the persistent reservation of the drive, wherein each of the key of the first host and the generated key of the second host further comprises an allocation index associated with a drive/media coupling.

10. The method of claim 9, wherein if it is determined that the second host will establish the non-persistent reservation, instructing the first host to release the persistent reservation.

11. The method of claim 10, wherein the logical load command further comprises an instruction to the second host to establish the reservation of the drive.

12. The method of claim 9, further comprising sending a preemption command to the second host instructing the second host to preempt the persistent reservation of the first host, the preemption command comprising a key of the first host and the generated key of the second host.

13. The method of claim 12, wherein each of the key of the first host and the generated key of the second host comprises an identifier of the drive and an identifier of the host.

14. The method of claim 9, wherein the persistent reservation comprises a SCSI persistent reservation.

15. The method of claim 9, wherein the media comprises sequential media.

16. The method of claim 15, wherein the sequential media comprises magnetic media.

17. At least one non-transitory processor readable storage medium storing a computer program of instructions configured to be readable by at least one processor for instructing the at least one processor to execute a computer process for performing the method as recited in claim 9.

18. A method operable in a controlling server for error recovery from a failed persistent reservation, the method comprising the following computer implemented steps:
receiving an error message from a host comprising a key held by a drive for a persistent reservation;
determining if the key was generated by a controlling server; and
controlling a recovery of the drive if the key was generated by the controlling server, wherein controlling the recovery of the drive comprises sending a command to preempt the persistent reservation of the drive, wherein controlling the recovery of the drive further comprises:
generating another key;
sending the command to the host or another host instructing the host or another host to preempt the persistent reservation of the drive using the generated another key and to physically unload a media from the drive.

19. The method of claim 18, wherein the key comprises at least two of a drive identifier, host identifier, and drive/media coupling allocation index identifier.

20. The method of claim 18, wherein determining if the key was generated by the controlling server, comprises:
determining if at least one portion of the key matches at least one of drive identifier, host identifier, and media allocation index identifier stored by the controlling server.

21. At least one non-transitory processor readable storage medium storing a computer program of instructions configured to be readable by at least one processor for instructing the at least one processor to execute a computer process for performing the method as recited in claim 18.

22. A system for transferring a media loaded in a drive from a first host to a second host, wherein the first host comprises a non-persistent reservation of the drive, the system comprising:
means for sending a logical unload command instructing the first host to logically unload the media and release the non-persistent reservation;
means for determining if the second host will establish a non-persistent reservation or persistent reservation of the drive; and
means for sending a logical load command instructing the second host to logically load the media, wherein the media is transferred from the first host to the second host without physically unloading or loading the media; and
means for generating a key for use by the second host in establishing the persistent reservation in the event it is determined that the second host will establish the persistent reservation of the drive, wherein the key comprises an allocation index associated with a drive/media coupling.

23. A system for transferring a media loaded in a drive from a first host to a second host, wherein the first host comprises a persistent reservation of the drive, the system comprising:
means for sending a logical unload command instructing the first host to logically unload the media and retain the persistent reservation;
means for determining if the second host will establish a non-persistent reservation or persistent reservation of the drive; and
means for sending a logical load command instructing the second host to logically load the media, wherein the media is transferred from the first host to the second host without physically unloading or loading the media; and means for generating a key for use by the second host in establishing the persistent reservation in the event it is determined that the second host will establish the persistent reservation of the drive, wherein each of the key of the first host and the generated key of the second host further comprises an allocation index associated with a drive/media coupling.

24. A system for error recovery from a failed persistent reservation comprising:

means for receiving an error message from a host comprising a key held by a drive for a persistent reservation;

means for determining if the key was generated by a controlling server; and means for controlling a recovery of the drive if the key was generated by the controlling server, wherein controlling the recovery of the drive comprises sending a command to preempt the persistent reservation of the drive, wherein the means for controlling the recovery of the drive further comprises:

means for generating another key;

means for sending the command to the host or another host instructing the host or another host to preempt the persistent reservation of the drive using the generated another key and to physically unload a media from the drive.

* * * * *